United States Patent [19]

Vockler

[11] Patent Number: 4,814,230

[45] Date of Patent: Mar. 21, 1989

[54] SILICONE-COATED OPAQUE GLASS

[76] Inventor: Larry D. Vockler, 15207 N.E. 53rd Ave., Vancouver, Wash. 98665

[21] Appl. No.: 149,588

[22] Filed: Jan. 28, 1988

[51] Int. Cl.$^4$ ............................................. C08L 83/04
[52] U.S. Cl. .................................. 428/429; 428/432; 428/428
[58] Field of Search ................ 428/429, 426, 428, 432

[56] References Cited

U.S. PATENT DOCUMENTS

| | | | |
|---|---|---|---|
| 3,442,664 | 5/1969 | Heine | 428/429 X |
| 3,507,680 | 4/1970 | Kiel | 428/429 X |
| 4,191,817 | 3/1980 | Schiller et al. | 428/429 X |
| 4,221,688 | 9/1980 | Johnson et al. | 525/119 X |
| 4,368,236 | 1/1983 | Frye | 428/429 X |
| 4,435,219 | 3/1984 | Greigger | 428/429 X |

FOREIGN PATENT DOCUMENTS 735398  5/1966  Canada .................................. 428/429

*Primary Examiner*—Nancy A. B. Swisher
*Attorney, Agent, or Firm*—Chernoff, Vilhauer, McClung & Stenzel

[57] ABSTRACT

A process of coating a glass substrate with an elastomeric film, as well as the composite product of said process is disclosed. The process comprises forming, by conventional coating methods, a film of an aqueous silicone emulsion on a surface of a glass substrate that may have a metallic coating. The aqueous silicone emulsion comprises anionically stabilized hydroxylated polydiorganosiloxane, colloidal silica, pigment, an acrylic thickening agent, and make-up water. The process is especially useful for rendering architectural-grade glass stronger and substantially opaque.

4 Claims, No Drawings

SILICONE-COATED OPAQUE GLASS

This invention relates to elastomeric coatings for glass.

BACKGROUND OF THE INVENTION

In recent years there has been increasing use of coated glass in the construction industry, especialy in spandrel and interior design applications, since such glass is substantially less expensive than conventional exterior materials such as brick and granite and presents aesthetically appealing design choices for interiors. Metallic coatings have been applied to enhance both the aesthetic appeal and reflective character of such glass, the latter conserving energy in air-conditioned buildings. Ceramic frit coatings have been used to color and to opacify such metal-coated glass. However, ceramic frit glass has several very serious drawbacks. One drawback lies in the tendency of ceramic frit-coated glass to become warped in the course of manufacture because of the high temperatures required to fire the glass. Another even more serious drawback is due to the presence of substantial amounts of lead in the ceramic frit coating composition. Lead, a toxic metal, requires special care in handling during ceramic frit coating processes and, in fact, its use in ceramic frit coating is now prohibited by regulations of the United States Environmental Protection Agency.

There is therefore a need in the art for a glass coating that enhances the tensile strength and energy conservation properties of construction or architectural grade glass, that can render the same opaque and impart color thereto, and that can withstand the elements, all without adding any hazardous materials to the environment. These needs and others are met by the process and resulting product of the present invention, which is summarized and described in detail below.

SUMMARY OF THE INVENTION

There are two aspects to the present invention. The first aspect provides a process of imparting a durable, non-toxic, opacifying eaastomeric film to glass, thereby to enhance its tensile strength, its durability and its insulative properties, thus rendering it generally more useful in building construction applications. The second aspect of the invention provides a novel composite product of the aforementioned process.

The process essentially comprises applying to a glass substrate a thin film of pH adjusted aqueous silicone emulsion comprising anionically stabilized hydroxylated polydiorganosiloxane, colloidal silica, pigment and an acrylic thickening agent, followed by curing the emulsion. The so-imparted film or coating has been shown to have extremely high adhesion and durability.

The foregoing and other objectives, features and advantages of the present invention will be more readily understood upon consideration of the following detailed description of the invention.

DETAILED DESCRIPTION OF THE INVENTION

The Substrate

The coating process of the present invention may be applied to virtually any glass substrate, coated or uncoated. In commercial building and architectural spandrel applications, there is commonly encountered vacuum-deposited reflective metallic-coated plate glass. This, too, is a suitable substrate for the process of the present invention. In addition, since the process of the present invention may be conducted entirely at ambient temperatures, it may be applied to any coated or uncoated glass substrate that would be adversely affected by elevated temperatures.

The Coating Composition

The coating composition of the present invention comprises a pH adjusted aqueous silicone emulsion of anionically stabilized hydroxylated polydiorganosiloxane, colloidal silica, pigment and a thickening agent.

The anionically stabilized hydroxylated polydiorganosiloxane and colloidal silica components preferred in the practice of the present invention are disclosed as an emulsion in U.S. Pat. No. 4,221,688 (assigned to Dow Corning Corporation of Midland, Michigan), the more detailed description of which is incorporated herein by this reference. Briefly, the emulsion may be described as a continuous aqueous phase and a dispersed phase, the dispersed phase consisting essentially of an anionically stabilized hydroxylated polydiorganosiloxane which contains about two silicon-bonded hydroxyls per molecule, an organic tin compound such as diorganotindicarboxylate and a colloidal silica, all with a pH of 9 to 11.5, prefereably 10.5 to 11. The solids content of the aqueous emulsion is 30 to 50 wt %, preferably approximately 40 wt %. Preferably, the emulsion contains from 15 to 50 wt %, most preferably 40 wt %, colloidal silica, based upon the amount of polydiorganosiloxane present. The preferred polydiorganosiloxane is polydimethylsiloxane with an average molecular weight of 200,000 to 700,000, and it may contain diethylamine or sodium from sodium hydroxide in amounts within the constraints of the above-mentioned pH limitations. Such an emulsion is commercially available from Dow Corning Corporation under the designation "Silicone Water-based Elastomers."

The pigment may be of any type or in any form that is compatible with the composition and is capable of rendering the same colored or substantially opaque. Preferred examples are aluminum oxide, iron oxides, titatium dioxide, zinc oxide, clays, carbon black, phthalocyanines, and quinacridones, all in dry or powdered form or in aqueous dispersions. Pigment may be present in the coating composition from 1.0 wt % to 5.0 wt %, preferably, 2.0 to 4.0 wt %, based upon the entire weight of the aqueous emulsion, including water.

The thickening agent should be present in an amount so as to render the composition sufficiently viscous that, upon application to the glass substrate, it readily adheres thereto. Viscosity may range widely depending upon the particular method of application. For spray application, the preferred viscosity range is 3000 to 7000 cps at 25° C. with a Brookfield No. 4 spindle at 2 rpm, or 14 to 24 seconds with a No. 2 Zahn cup. Classes of useful thickeners include cellulose derivitives, alkali salts of polyacrylates and polymethacrylates, sodium and ammonium salts of carboxylate copolymers and colloidal clays. The preferred class of thickening agent is sodium salts of polyacrylates, and in particular, an acid-containing, crosslinked acrylic emulsion copolymer made and sold by Rohm and Haas Company under the trade name "Acrysol ASE-60." The thickening agent is typically present from 0.1 to 1.0 wt %, preferably 0.5 wt %, based upon the entire weight of the aqueous emulsion, including water.

Thus, prior to application, the composition of the present invention comprises an aqueous silicone emulsion having a pH of 9 to 11.5 and including the following components in the approximate weight percentages noted, based upon the weight of the entire emulsion, including water:

(a) an aqueous emulsion containing 30 to 50 wt % anionically stabilized hydroxylated polydiorganosiloxane and colloidal silica;
(b) 1.0 to 5.0 wt % pigment;
(c) 0.1 to 1.0 wt % thickener; and
(d) balance water.

A colored or opacifying coating composition according to the present invention may be prepared by adding thickener to the aqueous emulsion of anionically stabilized hydroxylated polydiorganosiloxane and colloidal silica, adjusting the pH to the range noted, preferably by the addition of aqueous ammonium hydroxide, adding powdered pigment slowly, and adding a minor amount of defoamer if and when necessary, all while slowly mixing the components noted.

Application of the Coating

The composition may be applied to the glass substrate by conventional coating methods, including, but not limited to, dip coating, roller coating, kiss coating, curtain coating and spraying. Of these, spraying is preferred, either by conventional air gun, by so-called "airless" spray, or by a combination of the two. In connection with an "airless"/air application, air is injected at the point of the "airless" gun nozzle so as to break up the leading and trailing boundaries of the spray, allowing a more uniform deposition. The coating should be applied in a film averaging from about 0.1 mm to about 0.5 mm in thickness, preferably from about 0.2 to about 0.4 mm.

Curing of the composition, which removes effectively all of the water present, may be effected by air, by heat or by infrared radiation. Of these, an air cure is preferred, whereby the cure is generally sufficiently complete to permit shipping and handling the coated glass product within 2 hours, depending upon coating thickness, at 25° C. and 50% relative humidity. An air cure is complete within 7 to 14 days, depending upon coating thickness, temperature and relative humidity.

Example 1

A 6 mm thick pane of architectural grade spandrel-type glass having a vacuum-deposited titanium reflective coating applied to one side thereof was washed with hot water and detergent and allowed to dry. 851 lbs of an aqueous silicone emulsion of the above description comprising an anionically stabilized hydroxylated polydiorganosiloxane and colloidal silica (approximately 60 parts by weight water and 40 parts by combined weight of polydiorganosiloxane and colloidal silica) made and sold by Dow Corning Corporation under the designation "Silicone Water-based Elastomers" is added to a blending machine and agitated slowly while adding thereto a little over 4 lbs Rohm and Haas ASE-60 acrylic thickener diluted with water prior to addition, thereby adjusting the viscosity to approximately 18 seconds with a No. 2 Zahn cup at 25° C. The pH of the resulting suspension was checked and adjusted to 10.5–11 by the addition of aqueous ammonium hydroxide. 43 lbs of carbon black dry pigment was added and mixed until a homogeneous suspension was obtained (about 20 minutes). The resulting composition was applied in a substantially uniform coating averaging 0.2 mm in thickness to the non-metallic-coated side of the glass substrate by an "airless"/air spray system and allowed to cure at ambient temperature and approximately 50% relative humidity. At two hours, the so-coated substrate was ready for handling, and at seven days the cure was complete. The coated glass exhibited less than 5% transmission of the visible light spectrum, rendering it substantially opaque.

Adhesion characteristics of the coating were initially tested by a modified ASTM C794-80 peel adhesion test and proved to be excellent. After 7000 hours of accelerated aging in a QUV weatherometer, run in alternating 4-hour cycles of 100% relative humidity at 40° C. and intense ultraviolet light at 60° C., a sample of the silicone-coated glass was colorfast, solid and uncracked, with no adhesion loss.

For comparison, ASTM D412 tests were run for 1000 hours on each of a sample of the silicone-coated glass and a urethane sealant. The urethane sealant lost about 50% of its tensile strength and elongation, and was hard, crazed, cracked and discolored, whereas the silicone-coated sample did not lose any of its tensile strength, lost about 20% of its elongation, and remained rubbery, flexible, uncracked and colorfast.

In still another test, another sample of the so-coated glass was exposed to 2500 microwatts of ultraviolet light per square centimeter for 28 months. The coating remained colorfast and uncracked with excellent adhesion.

In addition to the above tests, samples of the silicone-coated glass passed the ASTM C1048-85 fallout resistance test (for measuring the ability of the coating to maintain the integrity of the glass upon shattering).

EXAMPLES 2–3

Substantially the same procedure noted in Example 1 was followed except that 1.0 wt % (Example 2) and 5.0 wt % (Example 3) parts by weight, respectively, of pigment were added. Samples of both products also were tested as noted in Example 1, with substantially the same results.

EXAMPLES 4–5

Substantially the same procedure noted in Example 1 was followed except that additional colloidal silica was added in 0.5 wt % (Example 4) and 1.0 wt % (Example 5), respectively. The same battery of tests set forth in Example 1 yielded substantially the same results.

EXAMPLE 6–7

Substantially the same procedure noted in Example 1 was followed except that 3 wt % of pigment was added, together with 1 wt % (Example 6) and 0.5 wt % (Example 7) of added colloidal silica. Test results were substantially the same as in Example 1.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A composite article comprising a glass substrate coated with a film so as to render said substrate substantially opaque, said film being an aqueous silicone emulsion consisting essentially of the components:
(a) anionically stabilized hydroxylated polydiorganosiloxane and colloidal silica;
(b) pigment;
(c) a thickening agent; and
(d) water.

2. The composite article of claim 1 wherein said components are present in the following approximate percentages by weight:
30 to 50 wt % component (a);
1.0 to 5.0 wt % component (b);
0.1 to 1.0 wt % component (c); and balance water.

3. The composite article of claim 1 wherein said thickening agent is an acid-containing crosslinked acrylic emulsion copolymer and said components are present in the following approximate percentages by weight:
40 wt % component (a);
2.0 to 4.0 wt % component (b);
0.5 wt % component (c); and
balance water.

4. The composite article of claim 1 wherein said glass substrate has previously been coated with a metallic coating.

* * * * *

UNITED STATES PATENT AND TRADEMARK OFFICE
CERTIFICATE OF CORRECTION

PATENT NO. : 4,814,230

DATED : March 21, 1989

INVENTOR(S) : Larry D. Vockler

It is certified that error appears in the above-identified patent and that said Letters Patent is hereby corrected as shown below:

Col. 1, line 9    Change "especialy" to --especially--

Col. 1, line 42   Change "eaastomeric" to --elastomeric--

Col. 2, line 26   Change "prefereably" to --preferably--

Signed and Sealed this

Sixth Day of November, 1990

Attest:

HARRY F. MANBECK, JR.

*Attesting Officer*     Commissioner of Patents and Trademarks